Sept. 17, 1940.  B. E. SHAW  2,215,057
REFRIGERANT SYSTEM CONTROLLER
Filed Nov. 3, 1938  2 Sheets—Sheet 1
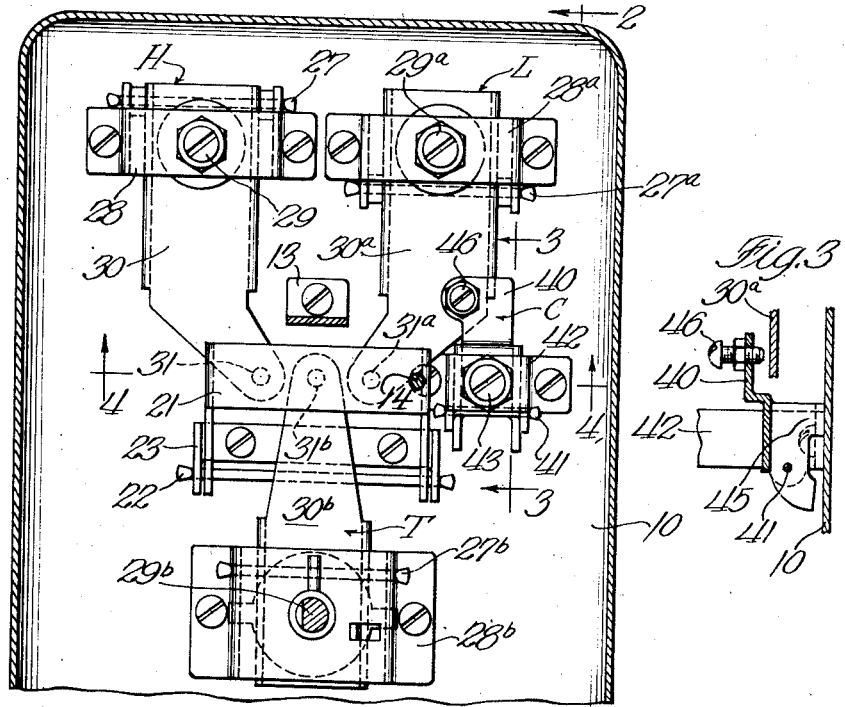
INVENTOR.
Burton E. Shaw
By Bair & Freeman
ATTORNEYS

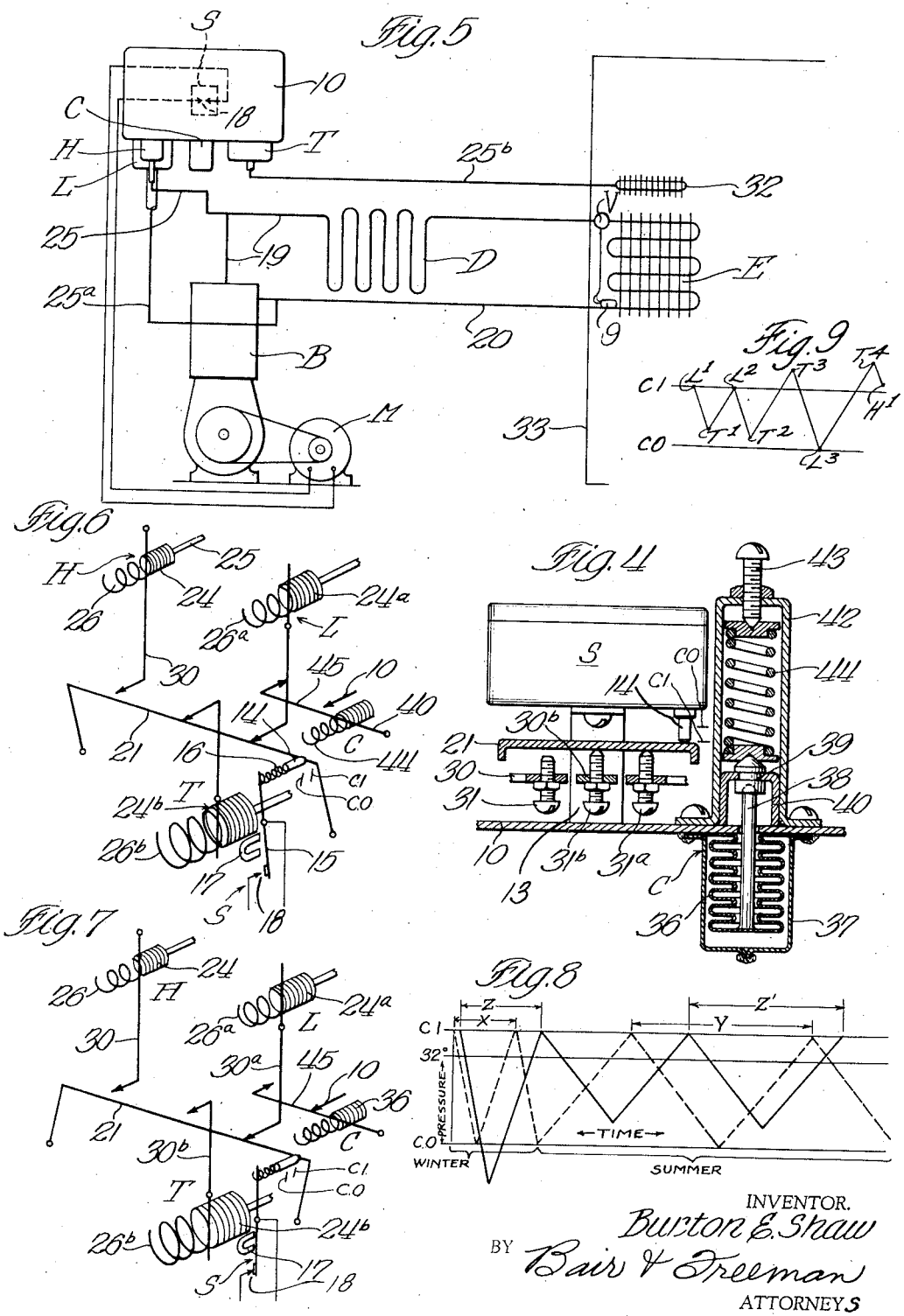

Patented Sept. 17, 1940

2,215,057

UNITED STATES PATENT OFFICE 2,215,057

REFRIGERANT SYSTEM CONTROLLER

Burton E. Shaw, Bristol, Ind., assignor to Penn Electric Switch Co., Goshen, Ind., a corporation of Iowa Application November 3, 1938, Serial No. 238,612

10 Claims. (Cl. 62—4)

An object of my present invention is to provide a controller for a refrigerant system which takes care of emergencies in the system in addition to performing the usual function of controlling the refrigerant compressor motor in response to conditions of the system.

Another object is to provide a controller which includes means to also compensate for seasonal temperature changes so that the cycles of operation of the refrigerant system may be shortened in the summer time and lengthened in the winter time, with respect to normal uncompensated operation which results in comparatively short cycles in the winter time and comparatively long ones in the summer time.

Another object is to provide a refrigerant system controller having a single switch operated by a plurality of condition responsive devices which are so mechanically interlocked that any individual responsive device can move the switch to cut-out position, but all of them must be in their cut-in positions before the switch can be moved to its cut-in position.

Another object is to provide a refrigerant system controller which eliminates frosting of the evaporator coil by causing the temperature of the coil to go above 32° Fahrenheit each cycle of operation, an ambient temperature compensating means being provided which affects the cut-out point, but not the cut-in point of the controller whereby compensation for seasonal temperature changes is had without disturbing the operation of the controller which permits the temperature of the evaporator coil to go above the freezing point in each cycle of operation.

Still another object is to provide a controller including a switch having cut-in and cut-out points which are substantially spaced from each other and a plurality of condition responsive devices engageable with a switch actuating element to move it to cut-out position whereby any one of the condition responsive devices can do so, but all of them must be returned to their cut-in positions before the switch actuating element can move to its cut-in position.

Still a further object is to provide a refrigerant system controller in which the normal control is in response to the low side of the refrigerant line and the action of this control device is modified by an ambient temperature responsive device, the association between the two being such as to permit the ambient temperature responsive device to affect only the cut-out position of the low side responsive controller.

My present invention further consists of novel features and details of construction and arrangement all of which will appear more fully in the following detailed description and accompanying drawings. For the purpose of illustrating my invention I have shown a preferred form thereof, although it is to be understood that various instrumentalities of which my invention consists can be variously arranged and operated and the invention is not limited to the precise arrangement herein shown and described.

With reference to the drawings in which like reference characters indicate like parts; Figure 1 is a front view of a refrigerant system controller embodying my invention showing the cover of the casing removed and a switch unit of the controller removed, the supporting bracket for the switch unit being shown in section and an actuating pin of the unit also being shown in section.

Figure 2 is a vertical sectional view on the line 2—2 of Figure 1 showing the cover in position.

Figure 3 is a fragmentary view of a portion of Figure 2 as taken on the line 3—3 of Figure 1.

Figure 4 is a sectional view on the line 4—4 of Figure 1.

Figure 5 is a diagrammatic view showing my controller hooked in a refrigerant system and showing the circuit connection with the refrigerant compressor motor thereof.

Figure 6 is a diagrammatic perspective view of my controller showing the switch in cut-out position as a result of temperature or low side pressure decrease to a predetermined value.

Figure 7 is a similar view showing cut-in position in response to low side increase in pressure.

Figure 8 is a graph showing the operation of the controller, and

Figure 9 is also a graph. It shows abnormal operation of the control device.

On the accompanying drawings I have used the reference numeral 10 to indicate a switch casing and 12 the cover therefor. Within the casing 10 a Z-shaped bracket 13 is mounted for supporting a switch unit S. The switch unit S as shown diagrammatically in Figure 6 includes an actuating pin 14, a switch armature 15, a spring 16 interposed between the two and a magnet 17 for securing snap action and substantially widening the differential of operation of the switch unit. Due to such widening of the differential, the cut-out and cut-in positions of the switch shown at CO and CI respectively in Figures 4 and 6 are substantially spaced from each other. The switch unit further includes a pair of contacts 18 which are connected in the circuit of a refrigerant compressor motor M.

The motor M (see Figure 5) operates a refrigerant compressor B, which is part of a refrigerant system. The system includes a high pressure line 19 commonly called "the high side," a condenser D and an evaporator E. The "low side" of the system includes a conduit 20. The expansion valve usually provided is indicated at V and its temperature-responsive bulb at 9.

I provide a plate 21 for operating the actuating pin 14 of the switch unit S. The plate 21 is pivoted on a pin 22 supported by a bracket 23.

For actuating the plate 21, I provide a plurality of condition responsive devices. These are indicated generally at H, L, T and C. H is a device responsive to the high side of the refrigerant system and comprises a bellows 24 communicating by a copper tube or the like 25 with the high side line 19. The bellows 24 is opposed by a spring 26 with the bellows and spring engaging opposite sides of a lever 30. The lever 30 is pivoted on a pin 27 supported by a bracket 28. A screw 29 serves as an adjustment for the tension of the spring 26 and thereby adjusts the range of operation of the high side controller H. The lever 30 carries a set screw 31 adapted to engage the switch actuating element or plate 21 and move it and thereby the pin 14 of the switch unit to cut-out position by an excessively high pressure being developed in the high side 19 of the refrigerant system. Normally the set screw 31 is spaced from the plate 21 as the high side controller is an emergency controller and operates the switch unit S only in the case of such excessive pressure.

The low side controller L is somewhat similar in construction to the high side controller and I have therefore used reference numerals 24a, 25a, 26a, 27a, 28a, 29a, 30a and 31a to indicate the similar parts. It will be noted that the pivot pin 27a is located between the bellows 24a and the plate 21 instead of the bellows 24 being located between the pin 27 and the plate 21 as in the case of the high side controller H. Thereby a decrease in pressure of the low side controller L will move the switch unit S to cut-out position. The line 25a of the bellows 24a is connected with the low side line 20. The temperature responsive controller T likewise has similar parts indicated at 24b, 25b, 26b, 27b, 28b, 29b, 30b and 31b. Like the low side controller L, the temperature controller T has the pivot 27b located so that it takes a decrease in temperature to raise the plate 21 and move the switch S to its cut-out position. The tubing 25b is connected with a finned bulb 32 as shown in Figure 5 which is responsive to the air temperature in a box 33 or the like. The evaporator E is located in the box 33 for refrigerating the space therein so that the bulb 32 is thereby responsive to the temperature in the refrigerating space. An adjusting knob 34 is provided for the adjusting screw 29b. It is cooperable with a dial 35 (see Figure 2) which is suitably graduated for box air temperature. Thereby the user of the box may adjust the temperature responsive device T so that the temperature in the box may be kept above the normal low limit or cut-out limit fixed by the low side controller L. The cut-in temperature, however, is unaffected by any adjustment of the temperature controller T because even though the set screw 31b may move to cut-in position, the plate 21 cannot return to such position until the set screw 31a has done so. I am thereby insured of the cut-in position of the switch (desirably above 32° Fahrenheit temperature in the avoporator E) is not lowered by adjustment of the temperature controller T.

Seasonal changes in temperature affect to some extent the operation of the switch structure thus far described. To compensate for these variations I provide the compensator control C. It includes a bellows 36 sealed in a casing 37. The casing 37 is responsive to ambient temperature and is charged with a suitable gas or liquid so that expansion thereof caused by ambient temperature contracts the bellows.

The head of the bellows 36 has attached thereto a stem 38 which seats in a fitting 39 of a lever 40. The lever 40 is pivoted on a pin 41 which in turn is supported by a bracket 42. A set screw 43 is threaded in the bracket 42 and a spring 44 is interposed between the set screw and the fitting 39. The spring 44 thereby opposes expansion of the gas or liquid in the casing 37.

The lever 40 has a pair of flanges 45 adapted to engage the casing 10 as shown in Figure 3 when the lever 30a of the low side controller L is in cut-in position of the switch. In this position a set screw 46 of the lever 40, it will be noted, is spaced from the lever 30a so that the bellows 36 is not affecting nor modifying the action of the lever 30a. This is also illustrated diagrammatically in Figure 7. Prior to the lever 30a reaching cut-out position shown diagrammatically in Figure 6, however, the lever 30a picks up the lever 40 so that the cut-out position of the switch is thereby modified.

As shown diagrammatically in Figure 8, dotted lines indicate the cycles of operation in winter and summer of a controller without compensation. In winter the cycles are shorter because the decrease in ambient temperature affects the pipes 25a and 25b and the bellows 24a and 24b thus modifying their action. In winter the cycles are accordingly of the length indicated at X while in summer they are indicated of the length indicated at Y. The cut-in and cut-out positions of the switch in response to pressure are indicated by lines CI and CO respectively. It will be noted that the cut-in position is above a line indicated as 32° which is the equivalent pressure for the temperature of the evaporator E when at 32° Fahrenheit. Each cycle of operation, the switch goes up to line CI.

By the use of the compensating device C, the cycles of operation of the refrigerant system are changed as indicated by the solid lines in Figure 8. In winter the cycles are lengthened with respect to the length X, this being indicated at Z. In summer they are decreased with respect to the dimension Y, the summer periods then being indicated as Z'. By the use of the compensator C therefore, the normal winter cycles are lengthened and the normal summer cycles are shortened. This gives a more even year around control of the refrigerant system and results in the desired operation regardless of the temperature ambient to the control switch or to either of the tubes 25a or 25b.

By arranging the compensator device so that it is stopped in the position of Figure 7 prior to cut-in position being assumed, modification of the cut-out position only of the low side controller is affected. This permits the control to so regulate the refrigerant system that each cycle of operation, the temperature of the evaporator increases to the point where defrosting can take place. Accordingly with the use of my controller, frosting of the evaporator is entirely eliminated.

Figure 8 shows normal operation with and without compensation. My controller, having the air temperature responsive bulb 32 operating the device 1', may cause the box temperature to vary, as illustrated by the graph in Figure 9. Several points are illustrated, wherein L¹ is the normal cut-in point in response to the low side controller L. If the door of the refrigerated space 33 remains closed, the switch S may cut out at point T¹ in response to the temperature responsive device T. The temperature will then go up and again be cut in by the low side controller L at point L². Another time, the door may have been opened once or twice during a cycle of operation so that the cut-out point in response to temperature occurs at point T². If after this the door remains closed so that the temperature of the air does not rise rapidly, cut-in may be attempted by the low side controller L at point CI but the control device T may still be in cut-out position and remain so until point T³ is reached. Thereupon cut-in occurs in response to the control device T moving to cut-in position. Several openings of the door may then raise the temperature of the bulb 32 so that the cut-out point at L³ is in response to the low side controller L. The next cut-in point is illustrated at T⁴ in response to the temperature device T and cut-out may then occur at H¹, even though the temperature has not gone down to the cut-in point, such cut-out being in response to the high side controller H responding to an abnormal pressure of refrigerant. It is thus obvious that the parts are so interlocked mechanically, and in a very simple manner, that any one of the control devices H, L or T may effect cut-out, but each one has to be at least in or beyond cut-in position before cut-in can be accomplished. This is probably best visualized in Figure 4, where it is obvious that any one of the screws 31, 31a or 31b may push the plate 21 and the pin 14 to cut-out position, but all three of the screws must be down far enough before the plate 21 can assume a position which will permit cut-in of the switch.

Although a preferred embodiment of the invention is shown in the drawings and described in the foregoing specification, it is to be understood that modifications may be made therein without departing from the spirit and scope of the invention as set forth in the appended claims.

I claim as my invention:

1. In a refrigerant system controller, a switch in circuit with a refrigerant compressor motor, and having cut-in and cut-out positions, a first device responsive to pressure in the low side of the refrigerant system, a second device responsive to pressure in the high side of the refrigerant system, a third device responsive to the temperature of air in the space being refrigerated by said refrigerant system and an ambient temperature responsive device coacting with said first device to modify the action thereof in accordance with seasonal temperature changes, said first, second and third devices being operatively connected with said switch.

2. In a refrigerant system controller, a switch in circuit with a refrigerant compressor motor and having spaced cut-in and cut-out positions, a plurality of devices responsive respectively to air temperature in the space being refrigerated, to high side pressure and to low side pressure, said devices being individually operable to move said switch to cut-out position whereby all of said responsive devices must be in their cut-in positions to effect movement thereof to cut-in position, and an ambient temperature responsive device coacting with said low side pressure device to modify the action thereof with respect to its cut-out position only.

3. In a refrigerant system controller, a switch in circuit with a refrigerant compressor motor, an actuating element for said switch having substantially spaced cut-in and cut-out positions, a low side pressure responsive device and an air temperature responsive device individually engageable with said actuating element to move it to cut-out position whereby both of said devices must be in their cut-in positions to permit movement of said actuating element to cut-in position, an ambient temperature responsive device coacting with one of said first two responsive devices to modify the action thereof, and a stop for said ambient temperature responsive device for stopping it in a predetermined position which position is assumed prior to the responsive device with which it coacts reaching its cut-in position whereby said ambient temperature responsive device affects only the cut-out action of said last mentioned responsive device.

4. In a refrigerant system controller, a switch in circuit with a refrigerant compressor motor, an actuating element for said switch having spaced cut-in and cut-out positions, low side pressure and air temperature responsive devices individually engageable with said actuating element to move it to cut-out position whereby both of said responsive devices must be in their cut-in positions to permit movement of said actuating element to cut-in position, and an ambient temperature responsive device coacting with said low side pressure responsive device to modify the action thereof.

5. In a refrigerant system controller, a switch in circuit with a refrigerant compressor motor, an actuating element for said switch having substantially spaced cut-in and cut-out positions, low side pressure and air temperature responsive devices individually engageable with said actuating element to move it to one of said positions whereby both of said condition responsive devices must be in their other positions in order to permit said actuating element to move to its other position, said responsive devices being respectively responsive to the refrigerant pressure in the intake line to the compressor and to the temperature of air in a space being cooled by the evaporator of the refrigerant system, an ambient temperature responsive device coacting with one of said first two responsive devices to modify the action thereof, and a stop for said ambient temperature responsive device for limiting its coaction to a part only of the movement of the responsive device with which it coacts.

6. In a refrigerant system controller, a switch in circuit with a refrigerant compressor motor, an actuating element for said switch, said switch including a magnet which substantially widens the differential of operation of the switch and thereby substantially spaces the cut-in and cut-out positions of the actuating element from each other, low side pressure and air temperature responsive devices individually engageable with said actuating element to move it to cut-out position whereby both of said responsive devices must be in their cut-in positions to permit movement of said actuating element to cut-in position, and an ambient temperature responsive device coacting with said low side pressure responsive device to modify the action thereof with respect to the cut-out position only thereof.

7. In a refrigerant system controller, a switch in circuit with a refrigerant compressor motor, an actuating element for said switch, said switch including a magnet which substantially widens the differential of operation of the switch and thereby substantially spaces the cut-in and cut-out positions of the actuating element from each other, low side pressure, air temperature and high side pressure responsive devices individually engageable with said actuating element to move it to one of its positions when any one of said devices moves to one of its positions whereby all of said responsive devices must be in their other positions to permit movement of said actuating element to its other position, and an ambient temperature responsive device coacting with said device responsive to low side pressure to modify the action thereof in accordance with seasonal temperature changes.

8. In a refrigerant system controller, a switch in circuit with a refrigerant compressor motor, an actuating element for said switch having cut-in and cut-out positions substantially spaced from each other, a first device responsive to pressure in the refrigerant system, a second device responsive to pressure in the high side of the refrigerant system, a third device responsive to the temperature of air in the space being refrigerated by said refrigerant system and an ambient temperature responsive device coacting with said first device to modify the action thereof in accordance with seasonal temperature changes, said first, second and third devices being individually effective to move said switch to cut-out position and collectively operable to permit its movement to cut-in position and said ambient temperature responsive device being cooperable with said first device to modify the cut-out position only thereof.

9. In a refrigerant system controller, a switch in circuit with a refrigerant compressor motor, an actuating element for said switch having spaced cut-in and cut-out positions, a first device responsive to pressure conditions in the refrigerant system, a second device responsive to pressure in the high side of the refrigerant system, a third device responsive to the temperature of air in the space being refrigerated by said refrigerant system, and an ambient temperature responsive device coacting with said first device to modify the action thereof in accordance with seasonal temperature changes, said first, second and third devices being individually effective to move said switch to cut-out position and collectively operable to permit its movement to cut-in position.

10. In a refrigerant system controller, a switch in circuit with a refrigerant compressor motor and having spaced cut-in and cut-out positions, a pair of devices responsive respectively to air temperature in the space being refrigerated and to low side pressure, said responsive devices each being operable independent of the other one to move said switch to cut-out position and both of said responsive devices being associated with said switch so that both must be in their cut-in positions to permit movement of said switch to its cut-in position.

BURTON E. SHAW.

DISCLAIMER 2,215,057.—*Burton E. Shaw*, Bristol, Ind. REFRIGERANT SYSTEM CONTROLLER. Patent dated September 17, 1940. Disclaimer filed May 2, 1942, by the inventor; the assignee, *Penn Electric Switch Co.*, approving.

Hereby enters this disclaimer to claim 3 of said patent.

[*Official Gazette June 16, 1942.*]